June 30, 1964    C. W. SAYE    3,138,975
JIG FOR HOLE DRILLING
Filed April 2, 1962    2 Sheets-Sheet 1
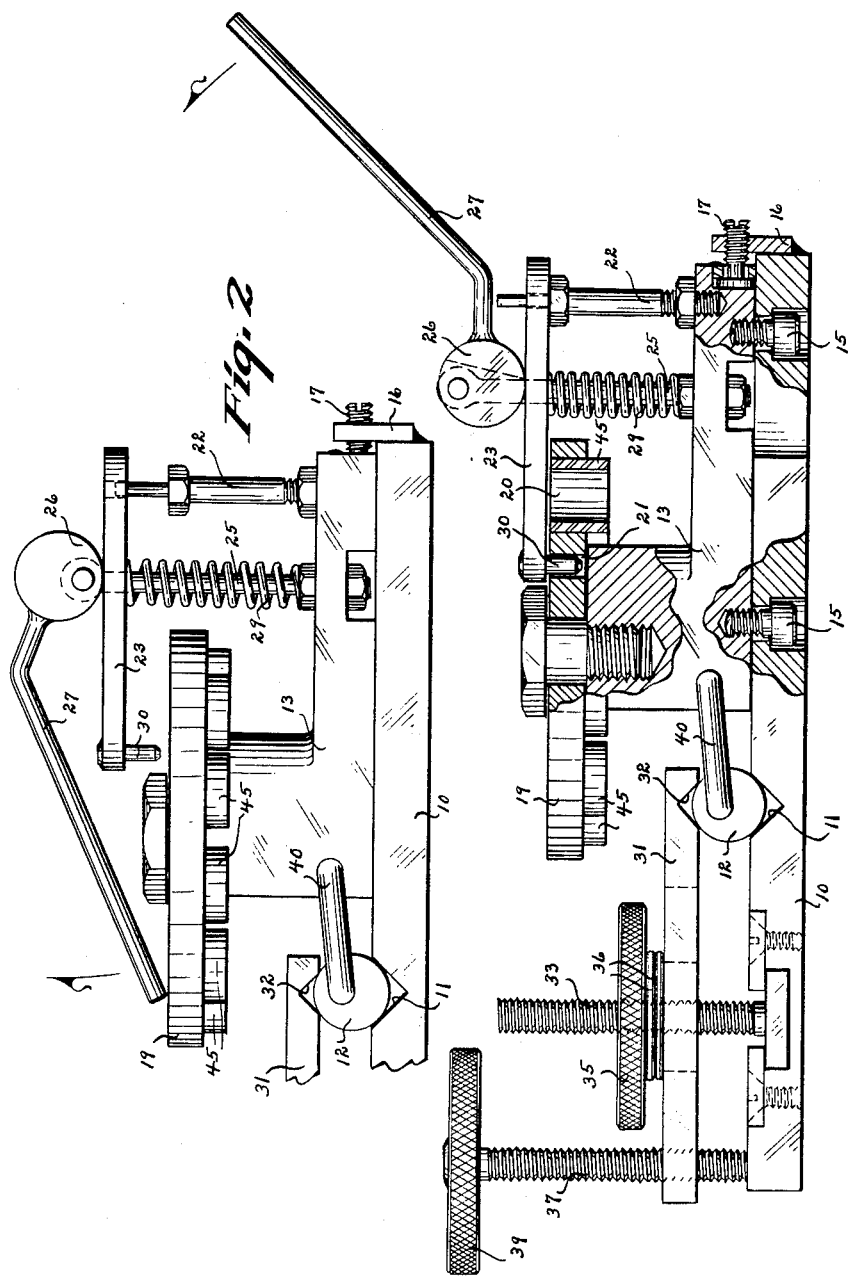
INVENTOR
CHARLES W. SAYE
BY Talbert Dick & Earley
ATTORNEYS
WITNESS
NORMAN G. TRAVISS June 30, 1964

C. W. SAYE 3,138,975

JIG FOR HOLE DRILLING

Filed April 2, 1962

INVENTOR
CHARLES W. SAYE

WITNESS
NORMAN G. TRAVISS

BY Talbert Dick & Farley
ATTORNEYS

United States Patent Office 3,138,975
Patented June 30, 1964

3,138,975
JIG FOR HOLE DRILLING
Charles W. Saye, 1214 N. Buchanan, Maryville, Mo.
Filed Apr. 2, 1962, Ser. No. 184,161
3 Claims. (Cl. 77—62)

This invention relates to a jig for use in drilling different sizes of holes and more particularly to jig that makes possible the accurate transverse drilling of a hole through a pipe, rod, bar or like.

One of the most difficult tasks is the drilling of a hole dead center through an object that is round in cross-section. Even more difficult is the drilling a hole on the corner of a member that is rectangular in cross-section. Also there are occasions when it is desired to drill a hole transversely through an elongated object, but at a position at one side of dead center. Still another problem confronting the fabricator is the requirement of holes of different diameters.

Therefore, one of the principal objects of my invention is to provide a jig means that facilitates the accurate transverse drilling of holes through elongated members.

A further object of this invention is to provide a jig for drilling holes that when once adjusted for a given result, will thereafter, and until changed, make possible the same holes in succeeding objects of the same character.

A still further object of this invention is to provide a jig for the drilling of holes that will successfully make possible a series of desired holes in a single element.

A still further object of this invention is to provide a hole drilling jig that makes possible the production of holes of various diameters.

A still further object of this invention is to provide a jig device for use in the drilling of holes that may be easily and quickly adjusted to produce desired results.

A still further object of this invention is to provide a means that facilitates the rapid and accurate drilling of holes through objects.

Still further objects of my invention are to provide a jig for use in the drilling of holes that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIG. 1 is a side view of my device with sections cut away to more fully illustrate its construction;

FIG. 2 is an enlarged side view of the rear end portion of the device and shows the plate disc released for adjustable rotation.

Figure 3:
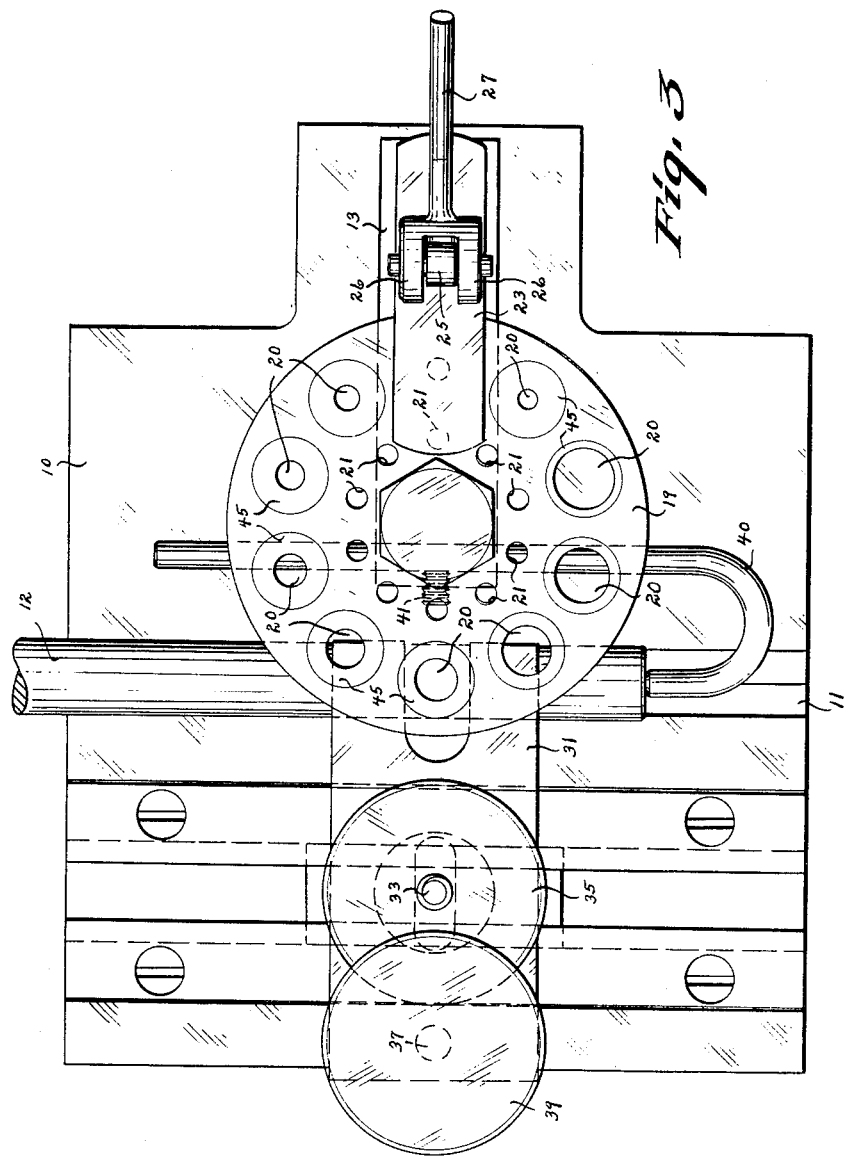
FIG. 3 is a top plan view of the device.

In these drawings, I have used the numeral 10 to designate the base platform. Transversely formed in the top of this block is a groove 11, V-shaped in cross-section as shown in FIG. 2. This groove is for receiving the member through which a hole is to be drilled, such as a rod 12. The numeral 13 designates a bearing block on the base platform and to the rear of the groove 11. This bearing block is held onto the base 10 by cap screws 15, but the bearing block may be longitudinally positioned on the base for very fine adjustment. This is accomplished by a bracket 16 on the rear end of the base 10, and with a set screw 17 threaded therethrough and with the end of the screw rotatably secured to the bearing block as shown in FIG. 1. Rotatably mounted at its center to the bearing block is a circular horizontal plate disc 19. The peripheral area of this circular plate is above and overlaps the central area of the length of the groove 11, as shown in FIG. 3. The numeral 20 designates a continuous circular row of drill bit receiving bushing holes in the peripheral area of the circular plate 19 and as shown in FIG. 3. By this arrangement of parts the circular plate may be rotated to bring any hole of the row of holes 20 into direct vertical alignment above the groove 11. The holes of the row of holes 20 are evenly spaced apart and are each of a different diameter so as to accommodate different sized drill bits. The numeral 21 designates a second continuous circular row of holes in the circular plate 19. The holes of the row 21, are evenly spaced apart, and are of the same number as the holes of the row of holes 20. The row of holes 21 is inside and concentric with the row of holes 20. The numeral 22 designates a post on the bearing block 13. The numeral 23 designates a bar vertically slidable on the post 22. The numeral 25 designates a rod having its lower end secured to the bearing block and its length slidably extending through the bar 23. Rotatably secured to the top of the rod 25 is an eccentric roller wheel 26 and which is in engagement with the top of the bar 23. The numeral 27 designates a hand lever on the roller wheel 26. The numeral 29 designates a coil spring embracing the rod 25, having one end operatively engaging the bearing block 13 and its other end engaging the underside of the bar 23. The numeral 30 designates a pointed downwardly extending locking pin on the underside of the bar 23 and capable of selectively entering any one of the holes of the row of holes 21. The numeral 31 designates an object holding bar and which may have a groove 32 in its bottom. This groove is inverted, V-shaped in cross-section and is directly above the groove 11 as shown in FIG. 1. The numeral 33 designates a threaded rod having its lower end secured to the base 10, and its length extending loosely through a relatively large hole in the holding bar 31. The numeral 35 designates a nut threaded onto the rod 33 and above the bar 31. The numeral 36 designates washer means engaging the underside of the nut 35 and the top of the bar 31. The numeral 37 designates a rod threaded through the bar 31 and having its lower end engaging the base 10. A head 39 is on the top of the rod 37. The numeral 40 designates a goose-neck rod having one end slidably adjustable in the bearing block 13 and its other end extending over the groove 11 as shown in FIG. 3. This rod 40 is held in the desired selected position by the set screw 41. When adjusted and held by the screw 41, this limiting stop rod means 40 will limit the sliding movement of the article 12 in the groove 11. Thus, subsequent articles will be drilled at the same point. If subsequent articles are to be drilled at different positions, then and in that event the stop means 40 will be readjusted and set accordingly. To use my device, it is merely necessary to lower the handle 27 as shown in FIG. 2. This rotates the cam eccentric 26 and permits the spring 29 to move the bar 23 upwardly and elevate the locking pin 30 from a hole 21 of the circular plate 19. At this time the circular plate 19 may be freely rotated to bring the desired size hole 20 over the member 12 to be drilled. The size of hole 20 selected should be the size of the bit used to drill the hole in the work object 12. After the selected hole is above the work to be drilled, the lever arm 27 is swung to the rear, thereby rotating the cam eccentric wheel 26 and forcing the pointed locking pin 30 into the vertically adjacent locking hole 21, as shown in FIG. 1. The circular plate 19 will therefore be held against rotation. The drill bit (not shown) is then inserted through the selected hole 20 and the drilling of the object 12 is commenced. The selected hole 20 will accurately guide and hold the bit so that the hole drilled in the object 12 will be straight and true. The object to be drilled will be centered in the groove 11, because the groove 11 is V-shaped in cross-section. The bar 31 will bear downwardly in the object 12 and hold the object tightly in the groove 11. This is accomplished by rotatably tightening either or both, the nut 35 and head 39. To remove the object after the drilling phase, either or both the nut 35 and head 39 are rotatably loosened. If desired, the holes 20 may be lined with an elongated sleeve 45 as shown in FIG. 1 and FIG. 2.

Some changes may be made in the construction and arrangement of my jig for hole drilling without departing from the real spirit and purpose of my invention, and it is my intension to cover by my claims, any modified forms of structure or use of mechanical equivalents which may be reasonably included within their scope.

I claim:

1. In a device for facilitating the drilling of holes, comprising, in combination,
   (a) a base,
   (b) a groove in the said base for receiving the object through which the hole is to be drilled,
   (c) a horizontal operatively rotatably mounted plate on said base having a portion of its area rotatable above said groove,
   (d) a plurality of different sized drill bit receiving bushing holes in said plate,
   (e) a means for detachably locking said plate in various positions of its rotation, and
   (f) means mounted on said base for holding the object comprising a horizontally disposed bar one end of which is adapted to engage the upper surface of the object, a threaded member threaded through the other end of said bar for engagement with said base, and means movably mounted on said base for movement parallel to the longitudinal axis of the object and threadably engaged with said bar for retractably exerting downward pressure thereon.

2. In a device for facilitating the drilling of holes, comprising, in combination,
   (a) a base,
   (b) a groove in the said base for receiving the object through which the hole is to be drilled,
   (c) a circular disc plate operatively rotatably secured at its center to said base with the area adjacent its periphery directly above said groove,
   (d) a continuous circular row of spaced apart drill bit receiving holes in said disc plate and in its area near its periphery; said holes being of different diameters,
   (e) a continuous circular row of spaced apart locking holes in said disc plate, said row being concentric with said row of drill bit receiving holes and said locking holes equal in number to the number of said drill bit receiving holes,
   (f) a horizontally disposed, movable member operatively secured to and biased away from said base,
   (g) a lock pin on said movable member capable of selectively engaging each of said locking holes,
   (h) eccentric cam means mounted on said base for forcing said member toward said plate whereby said pin engages one of said locking holes, and
   (i) means mounted on said base for holding the object comprising a horizontally disposed bar one end of which is adapted to engage the upper surface of the object, a threaded member threaded through the other end of said bar for engagement with said base, and means movably mounted on said base for movement parallel to the longitudinal axis of the object and threadably engaged with said bar for retractably exerting downward pressure thereon.

3. In a device for facilitating the drilling holes, comprising, in combination,
   (a) a base,
   (b) a groove in the said base for receiving the object through which the hole is to be drilled,
   (c) a circular disc plate operatively rotatably secured at its center to said base with the area adjacent its periphery directly above said groove,
   (d) a continuous circular row of spaced apart drill bit receiving holes in said disc plate and in its area near its periphery; said holes being of different diameters,
   (e) a continuous circular row of spaced apart locking holes in said disc plate, said row being concentric with said row of drill bit receiving holes and said locking holes equal in number to number of said drill bit receiving holes,
   (f) a horizontally disposed movable member operatively secured to and biased away from said base,
   (g) a locking pin on said movable member capable of selectively engaging each of said locking holes,
   (h) eccentric cam means for retractably shifting the position of said plate toward said base, and
   (i) means mounted on said base for holding the object comprising a horizontally disposed bar one end of which is adapted to engage the upper surface of the object, a threaded member threaded through the other end of said bar for engagement with said base, and means movably mounted on said base for movement parallel to the longitudinal axis of the object and threadably engaged with said bar for retractably exerting downward pressure thereon.

References Cited in the file of this patent

UNITED STATES PATENTS

| 907,735 | Cain | Dec. 29, 1908 |
| 1,329,970 | Hauser | Feb. 3, 1920 |

FOREIGN PATENTS

| 3,221 | Great Britain | 1910 |
| 988,677 | France | May 9, 1951 |
| 942,485 | Germany | May 5, 1956 |

OTHER REFERENCES

American Machinist Magazine, page 865, May 19, 1921.